(12) United States Patent
Arendt et al.

(10) Patent No.: US 7,634,602 B2
(45) Date of Patent: Dec. 15, 2009

(54) BUS SYSTEM WITH FEW CONTROL LINES

(75) Inventors: Steffen Arendt, Gundelfingen (DE); Franz Witte, Emmendingen (DE)

(73) Assignee: Micronas GmbH, Freiburg (DE)

(*) Notice: Subject to any disclaimer, the term of this patent is extended or adjusted under 35 U.S.C. 154(b) by 0 days.

(21) Appl. No.: 10/975,031

(22) Filed: Oct. 27, 2004

(65) Prior Publication Data
US 2005/0256988 A1   Nov. 17, 2005

(30) Foreign Application Priority Data
Oct. 28, 2003 (DE) .................. 103 50 388

(51) Int. Cl.
*G06F 13/42* (2006.01)

(52) U.S. Cl. .................. 710/105; 710/110; 710/117; 710/305

(58) Field of Classification Search .................. 710/15, 710/17–19, 40, 48, 61, 62–64, 104–105, 710/110–111, 305, 315
See application file for complete search history.

(56) References Cited

U.S. PATENT DOCUMENTS

| | | | |
|---|---|---|---|
| 4,935,894 A | 6/1990 | Ternes et al. | |
| 5,006,981 A | 4/1991 | Beltz et al. | |
| 5,315,706 A * | 5/1994 | Thomson et al. | 710/105 |
| 5,548,790 A * | 8/1996 | Mayer | 710/35 |
| 5,649,129 A * | 7/1997 | Kowert | 710/305 |
| 5,815,690 A * | 9/1998 | Kowert et al. | 713/401 |
| 6,122,683 A | 9/2000 | Ku et al. | |
| 6,233,641 B1 | 5/2001 | Graham et al. | |
| 6,266,710 B1 | 7/2001 | Dittmer et al. | |
| 6,920,632 B2 * | 7/2005 | Donovan et al. | 718/103 |
| 2001/0011312 A1 | 8/2001 | Chu | |
| 2002/0007432 A1 | 1/2002 | Ahern | |
| 2002/0138682 A1 | 9/2002 | Shatas et al. | |

FOREIGN PATENT DOCUMENTS

EP   0687980   12/1995

OTHER PUBLICATIONS

IEEE-488 Interface Bus (HP-IB/GP-IB).*
The GPIB (IEEE-488) Bus.*
GPIB Tutorial.*

* cited by examiner

*Primary Examiner*—Khanh Dang
(74) *Attorney, Agent, or Firm*—O'Shea Getz P.C.

(57) ABSTRACT

A bus system includes a bus and first and second bus interfaces, along with at least one data line that transmits data between the first and second bus interfaces. The bus system also includes first and second bus control devices, where the first bus control device is allocated to the first bus interface and the second bus control device is allocated to the second bus interface. First and second signaling lines signal a respective state of each of the first and second bus control devices and a third signaling line signals an exchange of data. A clock line is included that synchronizes the bus system by a clock. The first and second bus control devices each generate a control word having control information that relates to the data transmitted on the at least one data line. Also, the first and second bus control devices each transmit the control word through the at least one data line, and the first and second bus control devices receive the transmitted control word and relay the received data on the at least one data line based on the control information contained in the control word to at least one additional connected device.

18 Claims, 6 Drawing Sheets

BUS SYSTEM WITH FEW CONTROL LINES

BACKGROUND OF THE INVENTION

The invention relates in general to a bus system and in particular to a bus system having a reduced number of control lines.

To transmit data between two devices, bus systems are conventionally employed with a bus having bus interfaces that connect the devices transmitting and receiving the data. In most bus systems, it is predetermined as to which of the connected devices is the controlling bus device (master) and which is the serving bus device (slave). Frequent use is also made of a direct memory access (DMA) device.

In computers, buses are typically employed to transmit data between the different devices, where control of the data bus is handled by a central processing unit (CPU). For purposes of control, the CPU has, in addition to the data bus for data transmission, an address bus to transmit the address of the device to which or from which data is to be transmitted through the data bus. There are also control lines as part of a control bus leading from the CPU to the individual devices to signal whether a device is to receive data through the data bus or send data through the data bus. In addition, the control lines determine the time of transmission through the data bus. The process thus involves a central control of the data transmission through the data bus where the central control device (i.e., CPU) enables the data bus for the individual connected devices.

A generally known approach is the principle of handshaking through which the individual devices connected to a data bus communicate with each other, where a CPU also organizes coordination of the data access. In addition to the data bus to transmit data between the individual devices, there are typically at least three control lines. Usually, strobe-acknowledge or interrupt signals are transmitted on the control lines. Data input to the CPU is performed through the data bus when a connected peripheral device applies the data to be transmitted to the data bus and uses a strobe or interrupt signal to signal the CPU that data are available for transmission. The interrupt signal signals the peripheral device whether an input buffer of the receiving device is empty and therefore additional data can be applied to the data bus. As soon as the process has initiated the retrieval of data from the input buffer, the interrupt signal is canceled, thereby signaling to the connected peripheral device that another data transmission can be implemented.

In the case of a data output from the CPU to the peripheral device, the CPU applies the data to the control lines of the data bus and triggers a write pulse. The peripheral device acknowledges retrieval or receipt of the data with the acknowledge signal, after which a reset of the interrupt signal notifies the CPU that the data bus is ready for a new transmission. In this arrangement as well, assignment of the data bus to transmit data to the individual connected devices is thus performed by the CPU.

Generally known software and hardware interrupts are used to process the interrupts. Hardware interrupts are directed to interrupt control lines which also enable prioritization of various parallel-received inquiries for data bus arbitration. Conventional bus systems thus have a data bus, an address bus, and a control bus or corresponding signaling lines and control lines.

Currently available processor chips for digital signal processing, or their central control devices, are usually designed with a large number of random access memory locations (RAM) on the chip or die. Thus, these chips are usually fabricated using the relatively newest and expensive technology. For many reasons, it is not practical to integrate a multiplicity of interfaces on this type of processor die. However, the highly developed technology needed to fabricate the processor die is not required to provide the interfaces. In light of the variability of requirements related to special interfaces, it is also more practical to provide a separate interface. Additional reasons relate to fabrication parameters and material parameters, for example, dielectric strength. To connect a processor core of the control device on a processor die to an interface control device, for example an interface chip, a bus is required that is fast, requires few lines, has few overheads, and enables different types of transmission. For example, the bus addresses register and memories individually, or enables direct memory access.

What is needed is a bus system with a bus which is the interface between a processor core with a conventional bus terminal and interface devices associated with additional system devices and peripherals.

SUMMARY OF THE INVENTION

A bus system includes a bus and first and second bus interfaces, along with at least one data line that transmits data between the first and second bus interfaces. The bus system also includes first and second bus control devices, where the first bus control device is allocated to the first bus interface and the second bus control device is allocated to the second bus interface. First and second signaling lines signal a respective state of each of the first and second bus control devices and a third signaling line signals an exchange of data. A clock line is included that synchronizes the bus system by a clock. The first and second bus control devices each generate a control word having control information that relates to the data transmitted on the at least one data line. Also, the first and second bus control devices each transmit the control word through the at least one data line, and the first and second bus control devices receive the transmitted control word and relay the received data on the at least one data line based on the control information contained in the control word to at least one additional connected device.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
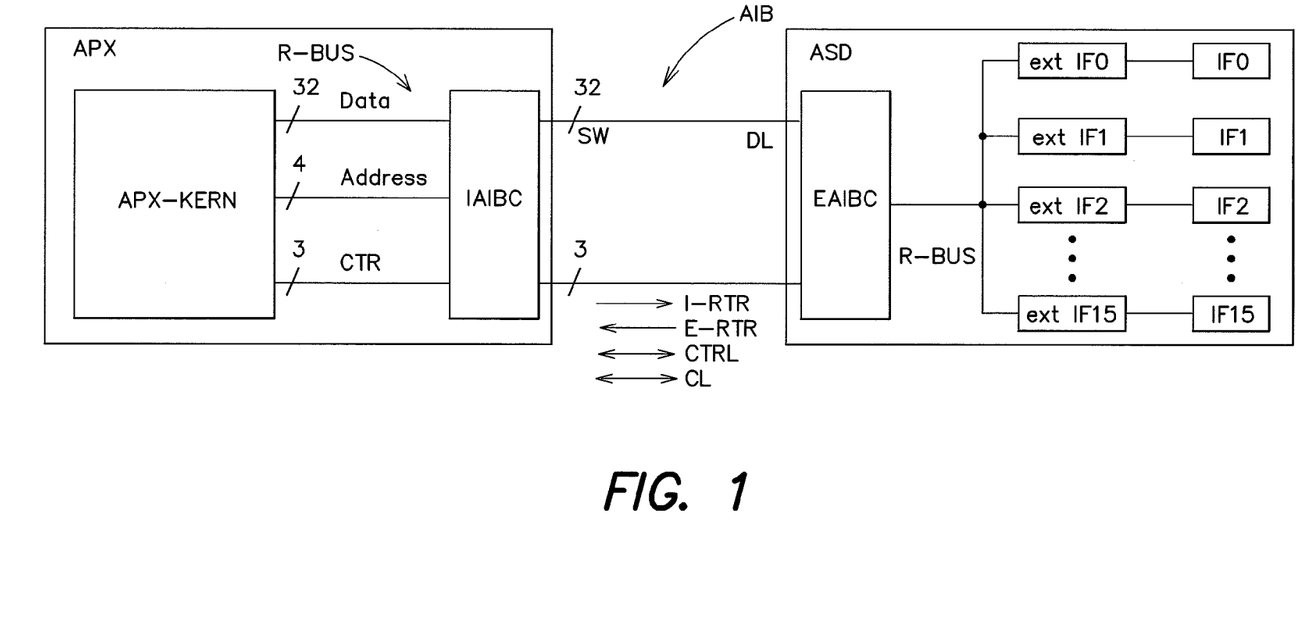
FIG. 1 is a block diagram illustration of a bus system.

FIG. 1 illustrates an exemplary embodiment of a bus system in which transmission of data is implemented between a processor core APX-KERN of a processor device APX and a plurality of external interface control devices IF0, IF1, IF2, . . . IF15. The processor core APX-KERN has a bus R-BUS having data lines, address lines, and control lines.

In addition to the processor core APX-KERN, which has, for example, a clock rate of 200 MHz, a bus interface IAIBC is located on the die or chip of the processor APX, at which interface the bus R-BUS terminates. The bus interface IAIBC, which is also referred to hereinafter as the internal bus interface or internal bus control device IAIBC, converts the signals bidirectionally from the conventional bus R-BUS to an advanced interface bus AIB.

The data to be transmitted from or to a second bus interface or bus control device EAIBC are passed through the advanced interface bus AIB. The second bus interface or bus control device is referred to hereinafter as the external bus control device or the external bus interface EAIBC. The external bus interface EAIBC serves as the interface between the advanced interface bus AIB and the external interface control devices IF0-IF15 which form interfaces to various external interface devices. The external bus interface EAIBC and the external interface control devices IF0-IF15 are located on a chip or circuit board in the form of an external interface arrangement ASD. Conventional devices, such as a computer or various other external peripheral devices, can be connected in a known manner to the external interface control devices IF0-IF15 to communicate with the central processor APX and the processor core APX-KERN. The communication occurs through the interconnected advanced interface bus AIB at a rate of, for example, 20 MHz.

In the example shown, the advanced interface bus AIB is composed of n data lines DL where, for example, n=32, and at least three control lines I-RTR, E-RTR, CTRL. While data and addresses are transmitted through at least one, and preferably, multiple parallel data lines DL, control signals are transmitted through the control lines. The control signals enable a self-arbitration (self-allocating access) to the advanced interface bus AIB. The bus interfaces IAIBC, EAIBC can have equal access to the advanced interface bus AIB. A ready-to-read signal IAIBC-RTR from the internal bus control device IAIBC, a ready-to-read signal EAIBC-RTR from the external bus control device EAIBC, and a control signal CTR are transmitted through the three control lines of the advanced interface bus AIB.

The control signal CTR is used specifically to identify the information or data that is transmitted through the advanced interface bus AIB via the data lines DL as payload (useful data) or as control data or control words SW. That is, the control signal CTR signals whether at a given instant actual payload or a control word SW announcing or requesting payload, is transmitted through the data lines DL.

To define the access moments in such a way that there is no conflict caused by simultaneous access by the two bus control devices IAIBC, EAIBC to the advanced interface bus AIB, the bus control devices IAIBC, EAIBC employ a bus clock CL. The different clock pulse edges of the bus clock CL are used to implement arbitration of the advanced interface bus AIB.

In the embodiment illustrated, the internal bus control device IAIBC accesses the advanced interface bus AIB whenever a falling clock edge of the bus clock CL is present. The external bus control device EAIBC accesses the advanced interface bus AIB whenever a rising clock pulse edge of the bus clock CL is present. In an alternative approach, the state of the bus clock CL can also be referenced as the criterion, that is, indicating whether the clock signal is in a low or high state.

A relatively simple bus protocol is used with the advanced interface bus AIB. For example, the bus protocol can be based on the following fundamental principles. When the ready-to-read signal IAIBC-RTR from the internal bus control device IAIBC is in the "high" state, and this "high" state is transmitted through the corresponding control line I-RTR to the external bus control device EAIBC, the external bus control device EAIBC is thereby notified that the internal bus control device IAIBC is ready to receive a control command. The ready-to-read signal IAIBC-RTR is generated by the internal bus control device IAIBC, then applied to the control line I-RTR. In this embodiment, the ready-to-read signal IAIBC may be modified by the internal bus control device IAIBC at any instant during the falling edge of the bus clock CL. Alternatively, for example, based on a different bus protocol, it may be possible to implement the change during the "low" state of the bus clock CL.

The corresponding ready-to-read signal EAIBC-RTR is generated by the external bus control device EAIBC and applied to the control line E-RTR of the advanced interface bus AIB. This ready-to-read signal EAIBC-RTR signals the internal bus control device IAIBC that the external bus control device EAIBC is ready to receive a control word or data when the ready-to-read signal EAIBC-RTR is in the "high" state. This ready-to-read signal EAIBC-RTR may be modified in the preferred embodiment by the external bus control device EAIBC together with the rising edge of the bus clock CL. An alternative is, for example, where changes to this ready-to-read signal are implemented during the "high" state for the bus clock CL.

The control signal CTR can be sent by both bus control devices IAIBC, EAIBC through the corresponding control line CTRL. In the normal state, the control signal CTR is in the "low" state. Whenever one of the bus control devices IAIBC, EAIBC wants to transmit the control signal CTR, it sets the control signal CTR to the "high" state, either briefly or for a relatively longer period of time. To prevent a conflict, a determination is also made that in each case that the bus control device IAIBC or EAIBC may activate a control command, for which bus control device the ready-to-read signal IAIBC-RTR or EAIBC-RTR is in the "low" state.

To prevent conflicts, the instant of setting the control signal CTR to the "high" state coincides, for example, with the instant at which the corresponding bus control device IAIBC or EAIBC is also permitted to modify the state of its ready-to-read signal IAIBC-RTR or EAIBC-RTR.

In a preferred embodiment, the two bus control devices IAIBC, EAIBC transmit the control signal CTR and a control word SW for each rising edge of the bus clock CL. Accordingly, the internal bus control device IAIBC is permitted to transmit one control command CTR for each rising edge of the bus clock CL of the advanced interface bus AIB. The external bus control device EAIBC is permitted to generate a control command CTR together with the rising edge of the bus clock CL of the advanced interface bus AIB.

Another advantageous principle of the preferred bus protocol is that the corresponding ready-to-read signal IAIBC-RTR or EAIBC-RTR remains in the "low" state whenever data or additional data are to be transmitted after the control word SW or the control signal CTR. As a result, the high-setting of the state for the ready-to-read signal IAIBC-RTR or EAIBC-RTR of the respective other bus control device EAIBC or IAIBC signals the end of the data transmission.

When the advanced interface bus AIB is in the idle state, both of the ready-to-read signals IAIBC-RTR and EAIBC-RTR are in the "high" state; that is, both bus control devices IAIBC and EAIBC are ready to receive data. If one of the bus control devices IAIBC, EAIBC wants to use the advanced interface bus AIB as the controlling device or master, this bus control device IAIBC, EAIBC sets its ready-to-read signal IAIBC-RTR or EAIBC-RTR to the "low" state. To avoid arbitration problems, the internal bus control device IAIBC changes its state of the ready-to-read signal IAIBC-RTR in response to a rising clock pulse edge of the bus clock CL, while the external bus control device EAIBC changes the state of its ready-to-read signal EAIBC-RTR in response to a falling clock pulse edge of the bus clock CL. Bus conflicts are thereby relatively easily avoided. In particular, different bus protocol types may be constructed on this basis. In the following discussion, sample operations are described for different situations.

Preferably, before each newly initiated data transfer, a control signal CTR is announced beforehand by the control word SW on the data lines DL, and the control signal CTR is announced on the control line CTRL. The control word SW, for example, can announce the type of the transfer, for example, to a register or memory based on DMA, but also the direction, for example, whether reading or writing is required, and/or the number or address of the addressed external interface control device IF0-IF15.

Advantageously, the control word SW along with the control signal CTR are identified as such. As a result, for example, a read command can be ignored or delayed by the bus control device IAIBC, EAIBC receiving this command so that it can issue a control command of higher priority.

Especially preferred embodiments thus have an advanced interface bus AIB with three or four control lines. In the case of three control lines, they are used to transmit the two ready-to-read signals IAIBC-RTR, EAIBC-RTR, along with the bus clock CL, such that transmittal of the control signal CTR is completely eliminated, or is similarly implemented by an appropriately coded control word SW on the data lines DL. In an embodiment with four control lines, separate control lines are provided in each case for transmission of the control signal CTR and of the bus clock CL. The bus clock CL thus has the function of a control signal.

Figure 2:
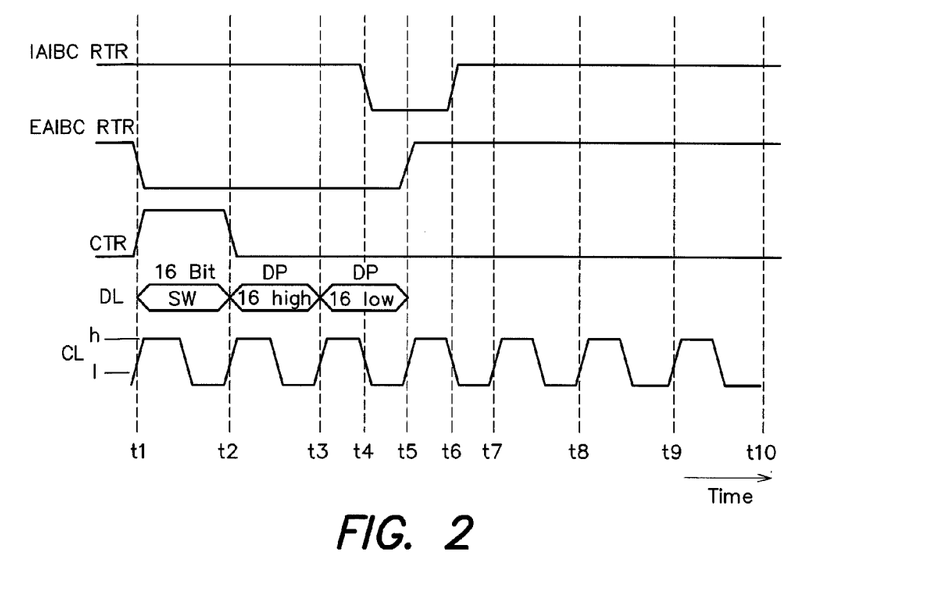
FIG. 2 is a state diagram illustration of different signals on the lines of a 16-bit bus where an external bus interface sends a 32-bit data packet.

The state diagram illustrated in FIG. 2 provides an example of the case of direct memory access by the external interface control device IF0 to a memory in the region of the central processor APX. Preferably, each of the external interface control devices IF0-IF15 has a DMA request line. To initiate a DMA transfer, the external interface control device IF0 sends a DMA request to the external bus control device EAIBC through corresponding direct connection lines or through a regular or conventional bus R-BUS. Transmission of the request through the advanced interface bus AIB is then implemented as described below.

In the event the external interface control device IF0 wants to write data to the central memory, the external interface control device IF0 sends a DMA request to the external bus control device EAIBC. In the case of more than one simultaneous request of this type, the external bus control device EAIBC decides which request has the highest priority. The other requests are either queued or rejected. The external bus control device EAIBC encodes the number or address of the external interface control device IF0 and transmits this in the control word SW through the advanced interface bus AIB. The transmission is implemented based on the default requirements described above.

The internal bus control device IAIBC scans the received control word SW for the number of the external interface control device IF0 and checks whether it is a read or write request. If the request is coded in the form of the control word SW as a write request, the system waits until preferably 32 data bits are available to be transmitted to the processor core APX-KERN and to be applied to its input port or R-BUS. The internal bus control device IAIBC then issues a DMA request and passes the data received through the advanced interface bus AIB through the bus R-BUS to the processor core APX-KERN, as long as the bus has been so enabled by the processor core.

In FIG. 2, as well as in the following figures illustrating the various state diagrams, the ready-to-read signal IAIBC-RTR is illustrated in the topmost line. The second line illustrates the ready-to-read signal EAIBC-RTR from the external control device EAIBC. The middle line illustrates the control signal CTR which is transmitted bidirectionally on one of the control lines CTRL of the advanced interface bus AIB. Illustrated below this is the flow of data on the data lines DL, specifically the data packets with preferably 16-bit data information per data packet, and the flow of the control words SW. Illustrated below this in the last line is the bus clock CL of the advanced interface bus AIB which is generated by one of the associated devices or externally, and is then applied to the bus control devices IAIBC, EAIBC. The illustrated signals IAIBC-RTR, EAIBC-RTR, CTR and CL are, respectively, in the "high" state "h" or "low" state "1", and these states can change sequentially over time as illustrated.

FIG. 2 illustrates the signal sequence over time when the external interface control device IF0 sends a data packet to the processor core APX-KERN. Initially, the two ready-to-read signals IAIBC-RTR, EAIBC-RTR are in the "high" state. Both bus control devices IAIBC, EAIBC are thus in the ready-to-receive state. The control signal CTR is in the "low" state, and no transmission of data takes place. At a first time t1, a DMA request is applied at the external bus control device EAIBC. At time t1 for the rising edge of the bus clock CL, the external bus control device EAIBC changes the state of its ready-to-read signal EAIBC-RTR to "low". Since the state of the ready-to-read signal IAIBC-RTR of the internal bus control device IAIBC is in the "high" state, that is, this device is ready to receive, the external bus control device EAIBC additionally sends the control signal CTR by setting its state at time t1 of the rising clock pulse edge of the bus clock CL to high. At the same time, the control word SW is sent through one of the data lines DL from the external bus control device EAIBC to the internal bus control device IAIBC. Based on the preferred data format, one or more data words or data packets DP follow the control word SW, which preferably has a length of 16 bits, the data words or packets DP each having 16-bit data information at times t2, t3 of the next rising clock pulse edges of the bus clock CL. As a result, the control signal CTR is again set to the low state so that the information on the data lines DL are recognized by the receiving internal bus control device IAIBC as useful data.

In an optional approach, the external bus control device EAIBC can delay or interrupt the transmission of data if at a later time t4 the internal bus control device IAIBC is not in the ready-to-receive state, that is, if ready-to-read signal IAIBC- RTR of the internal bus control device IAIBC is in the "low" state. This is the case until a new ready-to-receive state from the internal bus control device IAIBC is signaled by accordingly setting its ready-to-read signal IAIBC-RTR to high at a later time t6.

In the embodiment illustrated the internal bus control device IAIBC cannot send data directly through the bus R-BUS to the processor core APX-KERN and signals this situation by the stop signal, that is, by the temporary lowering of the ready-to-read signal IAIBC-RTR. In this case, this action has no effect since the external bus control device EAIBC has no additional data packets DP to transmit. If the purpose is to provide a priority control, this can be achieved by transmitting appropriate parameters and instructions within the control word SW.

Figure 3:
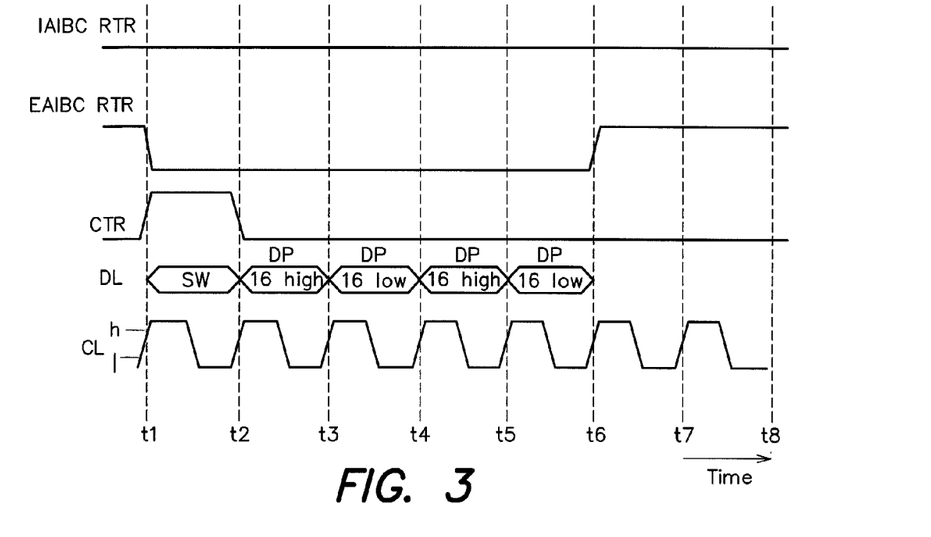
FIG. 3 is a state diagram illustration where the external bus interface sends additional data.

FIG. 3 illustrates the situation where for example, the external interface control device IF0 sends two data packets and is not thereby delayed or interrupted by a delay on the bus R-BUS to the processor core APX-KERN or other transmissions, for example, from or to the other external interface control devices IF1-IF15. Accordingly, the ready-to-read signal IAIBC-RTR from the internal bus control device IAIBC is continuously in the "high" state. When applying a transmission request from the external interface control device IF0 during the next rising-edge change of the bus clock CL to the "high" state, the external bus control device EAIBC can accordingly move to ready-to-read, that is, to the ready-to-read signal "low" state at time t1.

In addition, at time t1 the control signal CTR is set for one clock period to the "high" state to announce the transmission of the control word SW. At the same time, the control word SW is simultaneously placed on the data lines DL of the advanced interface bus AIB. Since the control word SW at the same time contains, or can contain, address information, the data lines DL serve simultaneously as address lines.

In the embodiment illustrated, the four data packets DP, each with 16-bit data information, are then transmitted over the next four clock periods of the bus clock CL through one of the data lines to the control word SW. The data information of the individual bits, or, as illustrated, the data packets DP can be coded here continually as "high" or "low" or, as illustrated, alternately as "high" and "low." After the transmission of all of the data packets DP, the external bus control device EAIBC again sets its ready-to-read signal EAIBC-RTR at the next rising clock pulse edge of the bus clock CL at time t6 to the "high" state; that is, the external bus control device EAIBC is again receive-ready for transmissions coming from the internal bus control device IAIBC. The transmission stops automatically at the instant no additional data is to be transmitted. As a result, the advanced interface bus AIB is simultaneously enabled for new data transmissions and access by one of the two bus control devices IAIBC or EAIBC.

Figure 4:
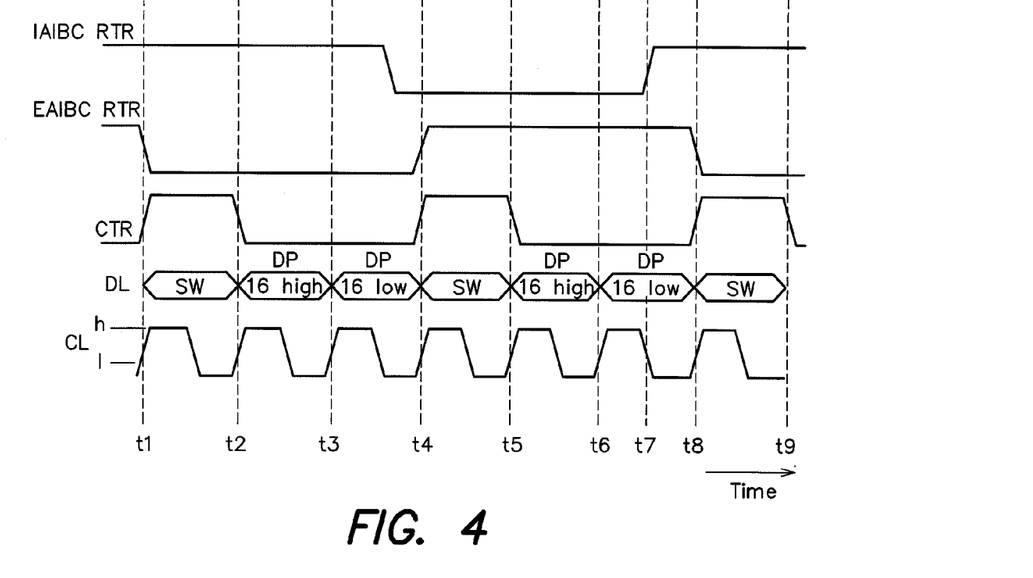
FIG. 4 is a state diagram illustration where the external bus interface sends data and is then interrupted by an internal bus interface.

FIG. 4 illustrates the situation where the external interface control device IF0 sends data but is then interrupted by the internal bus control device IAIBC. Starting from the state of readiness to read, both for the internal and external bus control devices IAIBC, EAIBC, transmission is initiated by the external bus control device EAIBC with the rising clock pulse edge in response to the presence of data to be transmitted in the external bus control device EAIBC. To this end, at the rising clock pulse edge of the bus clock CL, the ready-to-read signal EAIBC-RTR from the external bus control device EAIBC is set to the "low" state at time t1, the control signal CTR is activated through the control line CTRL for one clock period also at time t1, and a first control word SW is placed on the advanced interface bus AIB. The preferred approach is an embodiment where the advanced interface bus has 16 data lines DL, so that for each clock period, as illustrated, one control word SW or one complete data packet DP can be transmitted.

After transmission of the control word SW and the two data packets DP, the external bus control device EAIBC determines that, one half clock period of the bus clock CL earlier, the internal bus control device IAIBC has set the ready-to-read signal IAIBC-RTR to the "low" state between times t3 and t4, and is therefore not receive-ready. As a result, the external bus control device EAIBC can interrupt or delay the transmission of additional data. The external bus control device EAIBC moves to the "high" state at time t4 to signal the ready-to-receive state to the internal bus control device IAIBC. As a result, at the next rising clock pulse edge of the bus clock CL, the internal bus control device IAIBC can activate the control signal CTR for one clock period at time t4, and simultaneously place the control word SW on the data lines DL of the advanced interface bus AIB. During subsequent clock pulses, the internal bus control device IAIBC places the data packets DP on the data lines DL. The control word SW and the data packets DP are then received by the external bus control device EAIBC, evaluated, and supplied to the corresponding external interface control devices.

One half clock period after sending the last data packet, or at the next falling clock pulse edge of the bus clock CL after sending the last available data packet DP, the internal bus control device IAIBC again sets its ready-to-read signal IAIBC-RTR to the "high" state, and is thus again ready to receive at time period t7. Thus, at the next clock pulse edge, the external bus control device EAIBC can again move to the send state, as described for the initial transmission of the first control word and first data packets.

Figure 5:
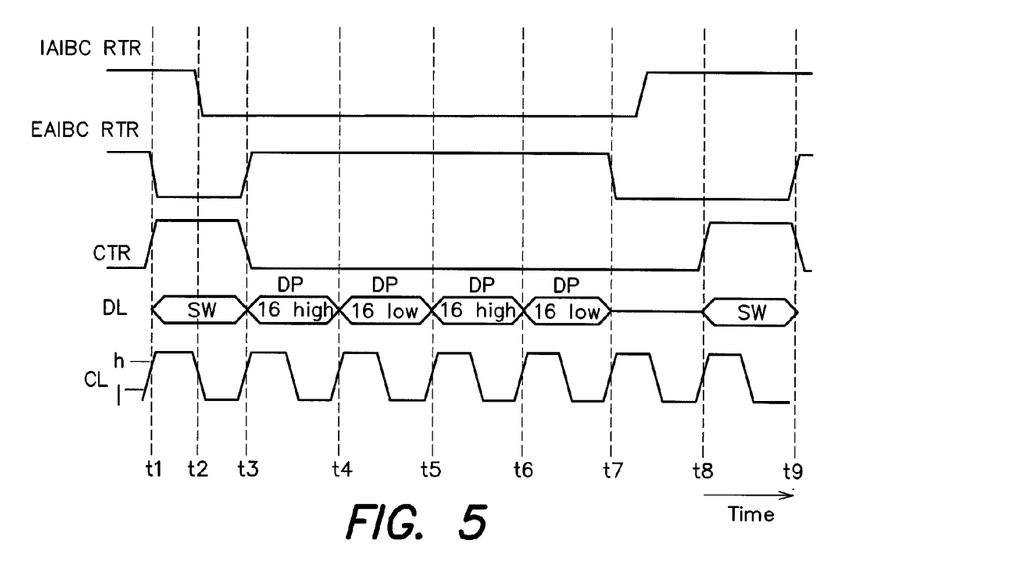
FIG. 5 is a state diagram illustration where the external bus interface requests data.

FIG. 5 illustrates the state diagram when, for example, the external interface control device IF0 requests a DMA read operation. In the example shown, it is assumed that the transmission here is fast and is not delayed or interrupted by the processor APX. Whenever more than one such request is present, the external bus interface EAIBC decides which request has the higher priority. All others are typically queued or rejected. The number or address of the external interface control device IF0 is coded and transmitted together with the DMA request in the control word SW through the advanced interface bus AIB after time t1. If this request is decoded as a read request, the internal bus control device IAIBC reacts like one of the internal DMA units and sends a DMA request through the bus R-BUS to the processor core APX-KERN. Based on a corresponding allocation, the device applies the 32 data bit to the bus R-BUS between the processor core APX-KERN and the internal bus control device IAIBC, then clears the request lines. The internal bus control device IAIBC sends this data through the advanced interface bus AIB to the external bus control device EAIBC. Here four data packets DP are transmitted, the first 16 data bits of the 32 data bits are first transmitted in a data packet based on the "high" state, then in a second data packet based on the low state, after which accordingly the second 16 data bits are transmitted. Once the external bus control device EAIBC has finished receiving the 32 data bits, where the first data bits may be sent to a buffer, the external bus control device EAIBC sends these to the requesting external interface control device IF0. Upon buffering the received data, the external interface control device IF0 clears the request lines and terminates the transmission.

The state diagram in FIG. 5 illustrates a corresponding sequence. Starting with the ready-to-read state of the two bus control devices IAIBC, EAIBC, the external bus control device EAIBC switches to the non-ready-to-read state at time t1 in response to the arrival of a DMA read request during the next rising clock pulse edge from one of the external interface control devices. In addition, the external bus control device EAIBC places the control signal CTR for one clock period to the "high" state. Further, a corresponding request is generated by the external bus control device EAIBC and transmitted through the data lines DL to the advanced interface bus AIB. The internal bus control device IAIBC receives this control word SW, and switches, for example, after appropriate transmission to the processor core APX-KERN, to the non-ready-to-read state one half clock period later with the next falling clock pulse edge of the bus clock CL after time t2. After this, the external bus control device EAIBC switches back to the ready-to-receive state, preferably already with the next rising clock pulse edge of the bus clock CL, and signals this by setting the ready-to-read signal EAIBC-RTR to high at time t3. The internal bus control device IAIBC can now apply, with the next clock pulses of the bus clock CL, the data received in the interim through the bus R-BUS from the processor core APX-KERN to the data lines DL of the advanced interface bus AIB. The external bus control device EAIBC awaiting data packets receives these data packets DL from the advanced interface bus AIB, and relays these to the requesting external interface control device IF0.

When the receive memory of the external bus control device EAIBC is full, the external bus control device EAIBC signals this to the internal bus control device IAIBC by setting the ready-to-receive signal EAIBC-RTR to low with the next rising clock pulse edge of the bus clock CL at time t7. The internal bus control device IAIBC then stops transmitting data until there is a new ready-to-receive signal from the external bus control device EAIBC. In this embodiment, the internal bus control device IAIBC also closes the line and places itself in the state to receive new commands by setting the ready-to-read signal IAIBC-RTR to high between times t7 and t8. The external bus control device EAIBC maintains its ready-to-read signal EAIBC-RTR in this state as long as necessary, for example at least for one clock cycle of the bus clock CL in the low state, until the memory is once again free, or, as in the embodiment illustrated, a new DMA request is received from the external interface control device IF0 or another one of external interface control devices IF1-IF15. After this, the control signal CTR is once again placed on the control line CTRL at time t8, and the control word SW is applied to the data lines DL of the advanced interface bus AIB.

Figure 6:
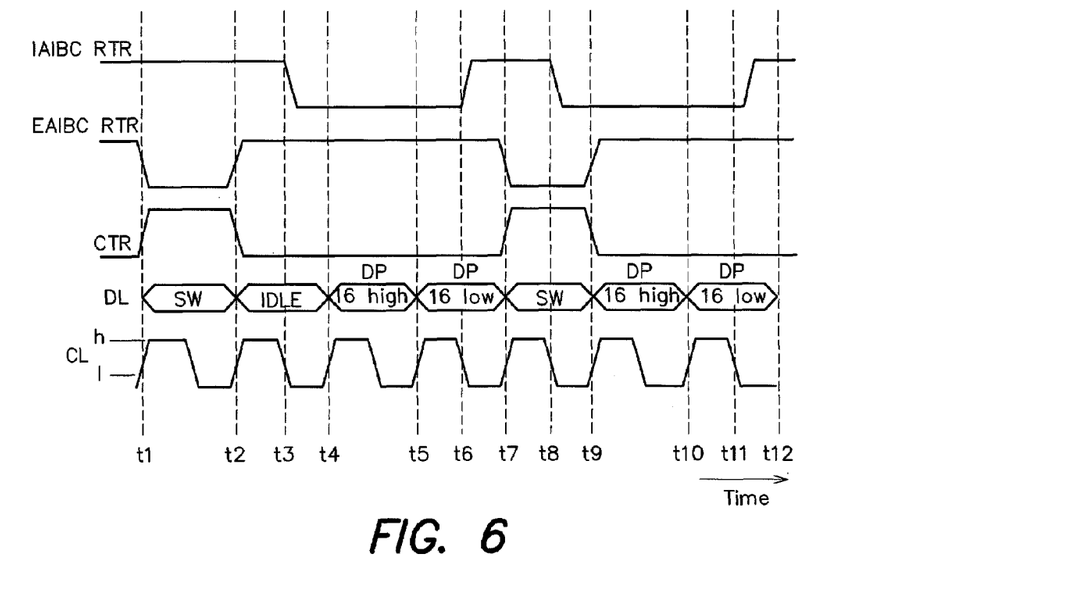
FIG. 6 is a state diagram illustration where the external bus interface requests data, while a delay is implemented by the bus between the internal bus interface and the processor core.

FIG. 6 illustrates the situation in which the external interface control device IF0 requests an individual data transmission which is, however, implemented in a delayed fashion by the bus R-BUS located between the internal bus control device IAIBC and the processor core APX-KERN when the processor core APX-KERN is not able to provide the requested data fast enough. The situation starts based on a ready-to-read state for the two bus control devices IAIBC, EAIBC. After receiving the data request from the external interface control device IF0, the external bus control device EAIBC switches its ready-to-read signal EAIBC-RTR to the non-ready state at time t1, simultaneously sends the control signal CTR, and sends the control word SW through the data lines DL to the internal bus control device IAIBC. As with the previous embodiments, this occurs with the rising edge of the bus clock CL. After one clock cycle, the external bus control device EAIBC switches back to the ready-to-read state and waits for a response from the internal bus control device IAIBC which has in the interim relayed the request through the bus R-BUS to the processor core APX-KERN, which awaits the transmission of the data. Since the data are initially provided in a delayed manner by the processor core APX-KERN, the process of switching the internal bus control device IAIBC from the ready-to-read state to the non-ready-to-read state is delayed by one clock cycle relative to the example of FIG. 5 until the data to be transmitted is available. Only then is the ready-to-read signal IAIBC-RTR switched to the "low" state. As a result of this delay, the internal bus control device IAIBC continues to remain ready-to-receive so that additional data or requests can be received through the advanced interface bus AIB. Blocking of the advanced interface bus AIB is thus reduced to the time actually required for the transmission of the control word SW and the data packets DP. After the data packets DP become available, and after switching to the non-ready-to-read state, the internal bus control device IAIBC sends the data packets DP through the data lines DL, where, in the format of the example, one or two 16-bit data packets are transmitted during the next clock cycles.

Optionally, the external bus control device EAIBC can delay or interrupt the transmission if its receive memory is full by having the ready-to-read signal EAIBC-RTR set to the "low" state for one clock cycle to transmit a new control word SW, and issue the control signal CTR through the control line CTRL at time t8. This is possible since after transmitting the data packets DP the internal bus control device IAIBC has in the interim changed to the ready-to-read state. This transmission of an additional control word SW by the external bus control device EAIBC is thus triggered either by the transition of the internal bus control device IAIBC to the ready-to-read state or by the inability of the external bus control device EAIBC to receive additional data. Another reason for transmitting an additional control word SW can be that the external bus control device EAIBC, for example, sends another, possibly more urgent, DMA request with the control word SW through the advanced interface bus AIB in the direction of the processor core APX-KERN.

After the external bus control device EAIBC has transmitted a new DMA request by issuing the additional control word SW and the processor core APX-KERN has accordingly supplied the data packets DP at the internal bus control device IAIBC, the transmission of the additional requested data packets DP can be implemented directly thereafter without a delay through the advanced interface bus AIB to the external bus control device EAIBC. This operation is implemented as already described for FIG. 5. In this embodiment as well, the external bus control device EAIBC again remains immediately ready to read after transmitting the DMA request or the corresponding control word SW to be able to immediately receive the awaited data packets DP and relay them to the requesting external interface control device IF0 after termination of the transmission operation through the advanced interface bus AIB.

Figure 7:
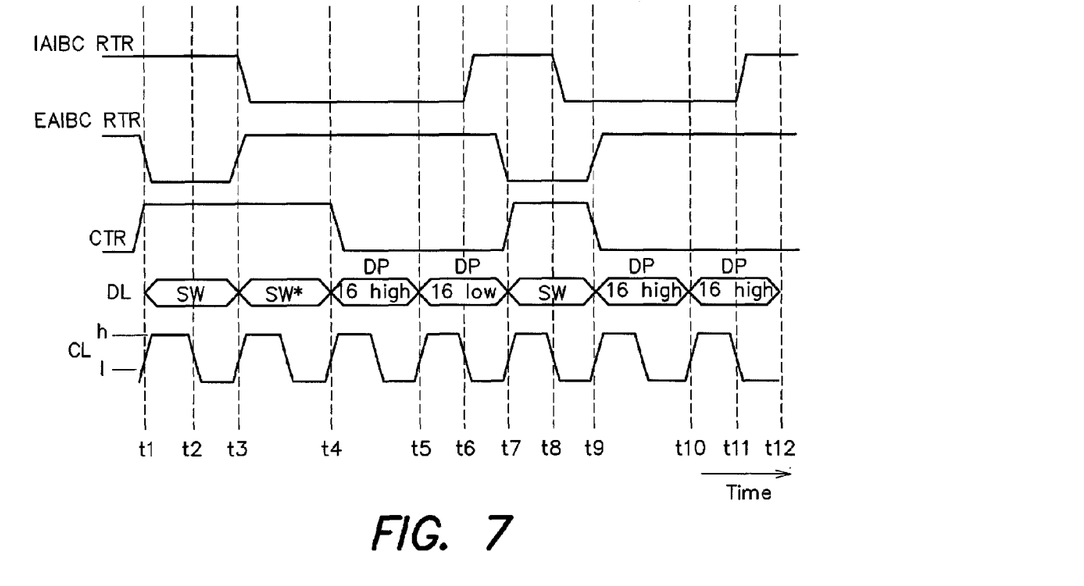
FIG. 7 is a state diagram illustration where the external bus interface requests data and is not interrupted.

FIG. 7 illustrates an embodiment for the sequence in the situation when the external interface control device IF0 requests data, where a fast transmission is interrupted by the processor core APX-KERN. In this example, the external bus control device EAIBC sends a first control word SW, in the manner already described, through the advanced interface bus AIB to the internal bus control device IAIBC. The internal bus control device IAIBC decodes this control word and requests from the processor core APX-KERN the data requested by the external interface control device IF0. After one half clock cycle, the internal bus control device IAIBC announces by setting the ready-to-read signal IAIBC-RTR to low that the data are available and that it wants to access the advanced interface bus AIB. The external bus control device EAIBC interrupts transmission of additional data or control words and moves after one clock cycle to the ready-to-read state at time t3.

The external bus control device EAIBC now expects the requested data on the data lines DL. However, the external bus control device EAIBC has transmitted to it from the internal bus control device IAIBC a higher-priority control word SW* through the data lines DL starting at time t3. Based on the selected data format, the data packets DP follow through the data lines DL of the advanced interface bus AIB, the data packets DP belonging directly to the higher-priority control word SW*.

After this data transmission, the internal bus control device IAIBC again transitions to the ready-to-read state at time t6. The external bus control device EAIBC transmits the received data to an external register or to the appropriate external interface control device IF0 indicated within the control word SW*, and sends a new request to the bus at time t7. After this, the external bus control device EAIBC sends the original DMA request, which was ignored by the internal bus control device IAIBC, once again to the advanced interface bus AIB, and then receives the requested data in the manner already described above.

Figure 8:
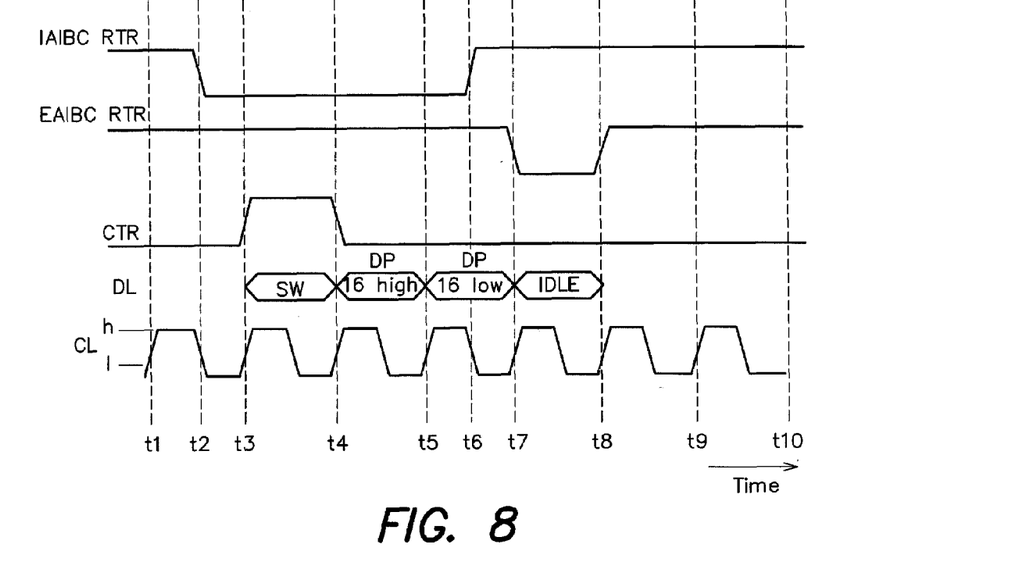
FIG. 8 is a state diagram illustration where the internal bus interface writes data to a region for the external bus interface.

FIG. 8 illustrates a state diagram for the situation where the processor APX writes data from its register to an external register. The external interface control devices IF0-IF15 are controlled by a set of registers referred to as external module registers ext IF0, . . . , ext IF15, and are interconnected between the external bus control device EAIBC and the external interface control devices IF0-IF15. Normally, access to these external module registers is through an internal bus R-BUS. In the advanced interface bus AIB interconnected between the processor APX and the external interface device IF0-IF15, the corresponding requests of processor APX or of processor core APX-KERN are appropriately translated by the internal and the external bus control devices IAIBC, EAIBC for transmission through the interconnected interface bus AIB. The external bus control device EAIBC implements a retranslation to the conventional format, then transmits the retranslated control signals and data to the requested external module registers ext IF0-ext IF15. Transmission through the advanced interface bus AIB can be time-multiplexed if there are problems.

The number or address of each of the external module registers ext IF0-ext IF15 to be addressed is coded by the internal bus control device IAIBC and transmitted in the control word SW through the advanced interface bus AIB, possibly together with information on the data format, to the external bus control device EAIBC for retranslation. To be able to provide the control word SW, the internal bus control device IAIBC checks the control signals, address information, and data information received through the bus R-BUS from the processor core APX-KERN in regard to the information to be converted, specifically the register address as well, and in regard to the information as to whether the operation is a read or write operation.

In the case of a write access to the external module registers or the external interface control devices IF0-IF15 by the processor APX, the register address is accordingly transmitted by the internal bus control device IAIBC to the external bus control device EAIBC together with the information that this is a write request. The external bus control device EAIBC decodes the control word SW received through the advanced interface bus AIB and places the corresponding write control signals and addresses of the desired external register on the corresponding bus lines to the external module registers. For the purpose of transmission through the advanced interface bus AIB in this case, the transmission of an original word with a 32-bit length is converted to two control words and/or data packets DP with a 16-bit length, and is appropriately reconstructed by the external bus control device EAIBC as a word of 32-bit length, and is then relayed to the external module registers ext IF0-ext IF15.

For purposes of illustrating a write operation by the processor APX to a selected module register from among the external module registers ext IF0-ext IF15, FIG. 8 begins from a state with the ready-to-read signals IAIBC-RTR, EAIBC-RTR set high, the control signal CTR set low, and a continuous bus clock CL of the interface bus AIB. In a first step, the internal bus control device IAIBC, after receiving a write request from the processor APX, sets its ready-to-read signal IAIBC-RTR to the "low" state, specifically during the next falling edge of the bus clock CL at time t2. Together with the next rising edge of the bus clock CL at time t3, the internal control device IAIBC issues the control signal CTR, and applies the control word SW with the addresses of the desired external module register plus additional information, specifically write information, to the data lines DL of the advanced interface bus AIB. At the start of the next two clock cycles, the data packets DP are applied by the internal bus control device IAIBC to the data lines DL, in each case with the rising clock pulse edges of the bus clock CL. After applying the last data packet DP to be transmitted to the data lines DL of the advanced interface bus AIB, the internal bus control device IAIBC sets its ready-to-read signal IAIBC-RTR back to the "high" state. It is thus once again ready to read. In this procedure, the external bus control device EAIBC first receives the control word SW, where the external bus control device EAIBC recognizes from the control signal CTR set high over this clock pulse duration that the data on the data lines DL represent the control word SW. After analyzing the address and type of control command, in this case a write command, the external bus control device EAIBC receives the data packets DP with the next clock cycles. Since the control signal CTR was set back to the "low" state at the end of transmitting the control word SW, the external bus control device EAIBC recognizes that the information received on the data lines DL of the advanced interface bus AIB are data which are supposed to be relayed to the external interface control devices IF0-IF15. Since the external bus control device EAIBC has previously received and decoded the control word SW, it applies, in parallel with transmission of the received data, the allocated address information and control information to the corresponding control lines so that the relayed data are handled only by the desired external interface control device IF0.

Also illustrated is the situation in which the external bus control device EAIBC is not able to receive any additional data due to a full receive memory or output memory. In this case, the external bus control device EAIBC sets its ready-to-read signal EAIBC-RTR temporarily, for example, for the duration of one clock cycle, to the "low" state at time t7. After one or more clock periods, the external bus control device EAIBC sets the ready-to-read signal EAIBC-RTR back to the "high" state, once it is again able to receive data due to the memory having been cleared at time t8. The duration of the "low" state is a multiple of the clock cycle of the bus clock CL for the advanced interface bus AIB to preclude frequencies higher than the bus clock CL of the advanced interface bus AIB.

Figure 9:
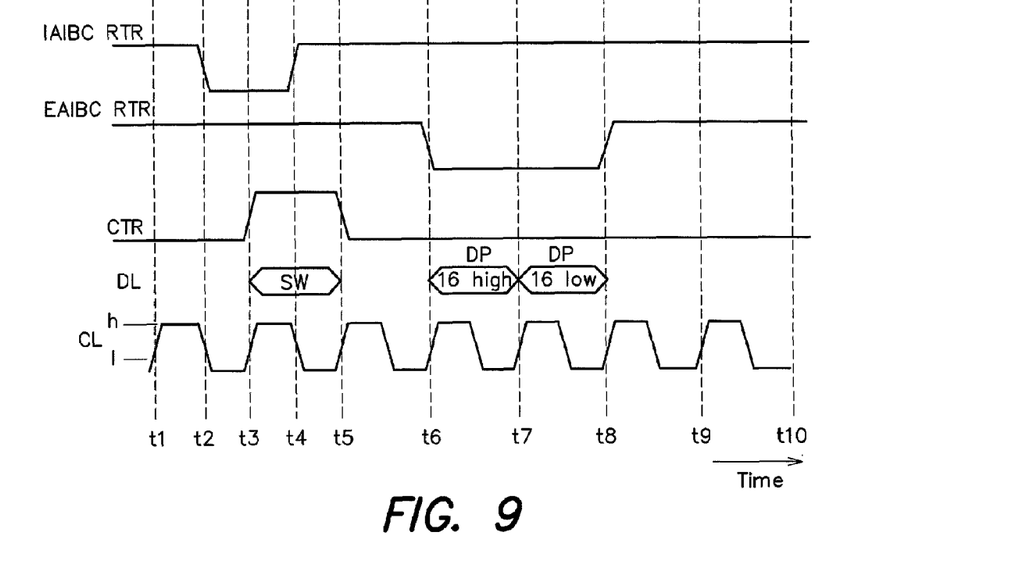
FIG. 9 is a state diagram illustration where the internal bus interface reads data from an external register region.

FIG. 9 is a state diagram illustrating the situation of a read request from the processor APX to one of the external interface control devices IF0-IF15, or to the module register ext IF0-ext IF15 allocated to the corresponding external interface control device. Here the corresponding register address, which the internal bus control device IAIBC receives through the R-BUS, is coded, together with additional information, specifically signaling the read request, to the control word SW, then transmitted to the external bus control device EAIBC. This device decodes the received control word SW and relays this together with the read request to the corresponding external interface control device IF0-IF15, or the external module register allocated to this device. The external interface control device IF0-IF15, or its external module registers ext IF0-ext IF15, then sends the content of the addressed register to the external bus control device EAIBC. This device converts the received data to data packets DP for the advanced interface bus AIB, and transmits these through the data lines DL to the internal bus control device IAIBC. This device implements decoding and relays the data to the processor core APX-KERN through the bus R-BUS as a 32-bit word.

This sequence is seen in the state diagram of FIG. 9. Starting with the states shown in FIG. 8, after receiving a corresponding read request, the ready-to-read signal EAIBC-RTR is set by the internal bus control device IAIBC to the "low" state together with the next falling clock pulse edge of the bus clock CL at time t2. With the next rising clock pulse edge of the bus clock CL, the control signal CTR is placed on the control signal line, and the generated control word SW is applied to the data lines DL of the advanced interface bus AIB at time t3. With the next rising clock pulse edge, the internal bus control device IAIBC moves to the ready-to-read state at time t4 to be able to receive the requested data. With the next rising clock pulse edge of the bus clock CL, that is, after transmitting the control word SW, the control signal CTR has reset to the "low" state, after which the internal bus control device IAIBC waits for the reception of data, or possibly higher-priority control words and data, from the external bus control device EAIBC. After the external bus control device EAIBC has received the control word SW and relayed it in decoded form to the external interface control devices IF0-IF15, the addressed external interface control device IF0 applies the data from its corresponding external module registers ext IF 0 to the data lines leading to the external bus control device EAIBC. This device then receives the data and converts it to a format suitable for the advanced interface bus AIB. Subsequently, the external bus control device EAIBC sets its ready-to-read signal EAIBC-RTR with the next rising clock pulse edge of the bus clock CL to the "low" state at time t6, and applies, as long as there are data to be transmitted, corresponding data or data packets DP to the data lines DL of the advanced interface bus AIB over the next clock cycles, each time with the rising clock pulse edge of the bus clock CL. After transmitting the last requested data packets DP, the external bus control device EAIBC transitions back to the ready-to-read state at time t8. In parallel with this action, the internal bus control device IAIBC receives the data or data packets DP applied to the data lines DL of the advanced interface bus AIB, and applies these in the appropriate format for the bus R-BUS to the processor core APX-KERN.

Based on this embodiment, it is evident that an instantaneous view of the line states does not allow one to clearly determine which state the bus control devices IAIBC, EAIBC are in. In a state in which the external bus control device EAIBC has relayed the read request to the corresponding external interface control device IF0 and is waiting for transmission of the corresponding data, both the internal and the external bus control devices IAIBC, EAIBC are in the inactive wait state. This state has the particular advantage that subsequently either the requested data can be transmitted through the advanced interface bus AIB, or it is possible for one of the two bus control devices IAIBC or EAIBC to transmit through the advanced interface bus AIB a higher-priority request received in the interim. As the example of FIG. 7 illustrates, in this case of an interposed control instruction and data transmission, the originally requested data transmission is requested once again.

Figure 10:
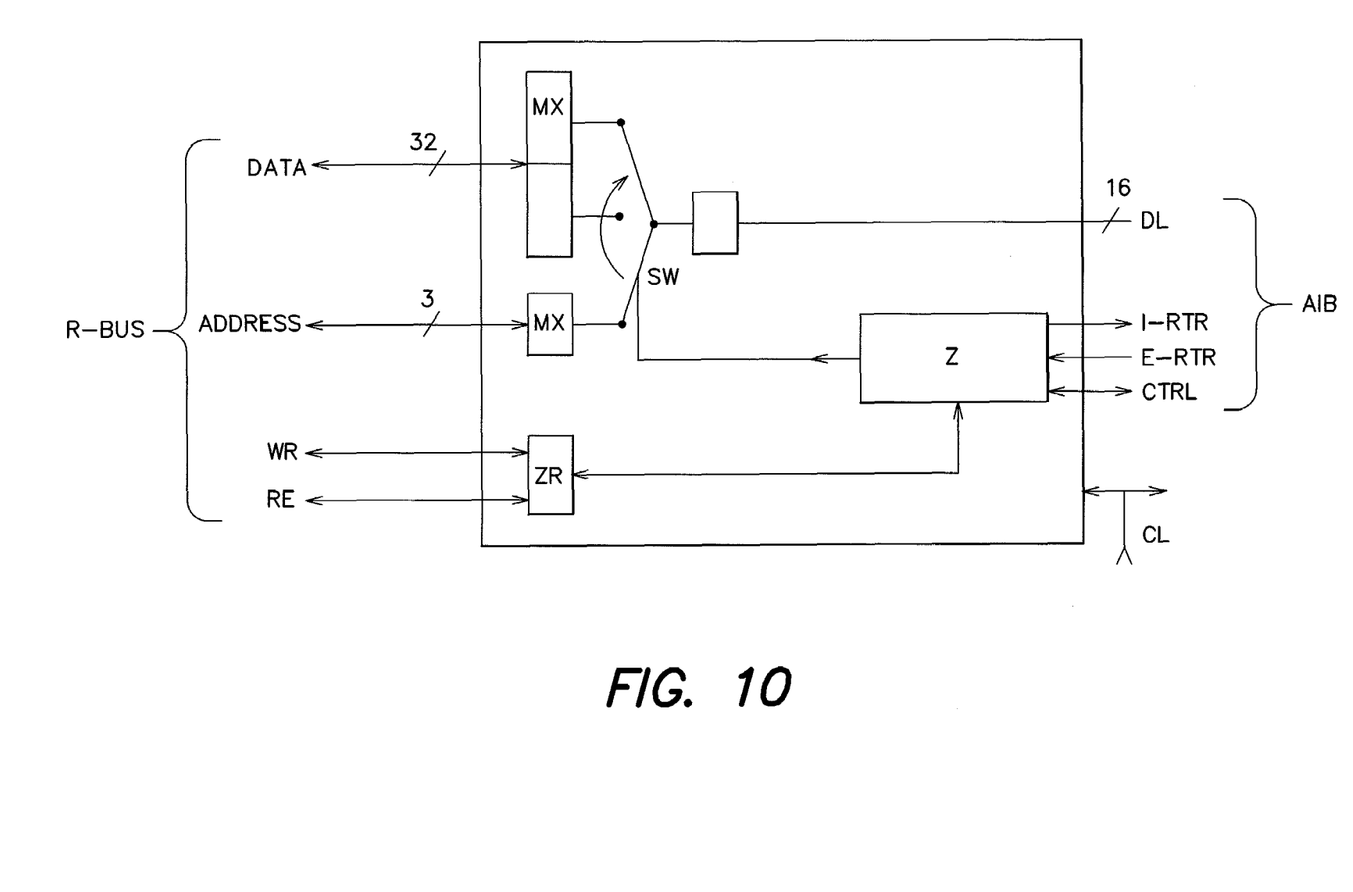
FIG. 10 is a block diagram illustration of the bus devices for converting addresses of an address bus between a system bus and an advanced interface bus.

FIG. 10 illustrates an embodiment of one of the bus control devices IAIBC or EAIBC. The bus control device can be of relatively simple design comprising multiplexers and demultiplexers MX which adapt the data width of the bus R-BUS to the data width of the advanced interface bus AIB. In addition, the bus control devices IAIBC, EAIBC have a state machine Z, the state of which can be queried by a state register ZR and is settable. As long as the third control line does not also assume a clock function, an external clock CL as the clock of the advanced interface bus AIB is applied to control the individual components. The state machine Z also selectively either switches incoming address data and state information, or actual data to be transmitted, to the data lines DL of the advanced interface bus AIB. The state machine Z has at least three outputs through which the control information is transmitted to the other communicating bus control device. The state register ZR has control lines WR, RE to exchange, for example, write and read requests with the processor core APX-KERN.

One possible advantageous application specifically of this circuit arrangement with this type of bus control device IAIBC, EAIBC is to connect a microprocessor APX to an interface chip ASD. Use of the advanced interface bus AIB and the bus control devices IAIBC, EAIBC is particularly advantageous when the goal is to realize a multi-master-capable bus with low controller overhead and few control lines.

The bus control devices IAIBC, EAIBC preferably have a comparator V which compares the priority of previously received read and write requests with the priority of currently received read and write requests, and, based on the comparison, permits or does not permit an interrupt of the current exchange of data. Advantageously, the bus control devices IAIBC, EAIBC have a detector D which recognizes data congestion on further-extending data lines to the external interface control devices IF0-IF15 or to the processor core APX-KERN, that is, subsequent receiving devices, and delays the data transmission or data exchange during the time of this data congestion.

It is also possible to link additional bus terminals IAIBC, EAIBC, or to interconnect such bus terminals to other additional bus control devices within the functional range of the bus. In this case, additional signaling lines must be provided to signal the ready-to-read state of the corresponding additionally-introduced bus control device.

The names of the bus control devices IAIBC, EAIBC, and the interface bus AIB, serve to differentiate between the individual components relative to other described components, specifically, relative to the buses R-BUS, between which the advanced interface bus AIB along with the bus control devices IAIBC, EAIBC are interconnected. In general, it is also possible to have the control devices IAIBC, EAIBC, and one advanced interface bus AIB. Also, the number of the data lines DL is also not restricted to sixteen. It is also possible to implement a greater or lesser number of the data lines DL. Depending on the ratio of the number of the lines for the bus R-BUS relative to the advanced interface bus AIB, a corresponding number of buffers and multiplexers may be provided.

The advanced interface bus AIB thus advantageously has two bus control devices IAIBC, EAIBC which are connected between two buses or bus terminals. As is true for conventional buses, the buses or bus terminals each have separate data lines, address lines, and control lines.

Although the present invention has been shown and described with respect to several preferred embodiments thereof, various changes, omissions and additions to the form and detail thereof, may be made therein, without departing from the spirit and scope of the invention.

What is claimed is:

1. A bus system, comprising:
    an interface bus having at least one data line on which data are transmitted;
    first and second bus interfaces connected by the interface bus; and
    first and second bus control devices, where the first bus control device is allocated to the first bus interface and the second bus control device is allocated to the second bus interface;
    where the interface bus includes first and second signaling lines that signal a respective state of each of the first and second bus control devices, a third signaling line that signals an exchange of data on the at least one data line, and a clock line that synchronizes the bus system by a clock;
    where the first and second bus control devices each generate a control word having control information that relates to the data transmitted on the at least one data line, and where one of the first and second bus control devices transmits the control word on the at least one data line and where the other one of the first and second bus control devices receives the transmitted control word and relays the received data on the at least one data line based on the control information contained in the control word to at least one additional connected device and where the first and second signaling lines are unidirectional in opposite directions, and where the first signaling line is allocated to the first bus control device and the second signaling line is allocated to the second bus control device, where the first and second bus control devices access the bus system at different clock states of the clock and self-arbitrate access of the first and second bus interfaces to the bus.

2. The bus system of claim 1, where one of the first and second bus control devices transmit a control signal on the third signaling line when the control word is transmitted through the at least one data line.

3. The bus system of claim 1, where one of the first and second bus control devices codes address data and transmits the coded address data as the control word and the other one of the first and second bus control devices receives the coded address data as the control word.

4. The bus system of claim 1, where one of the first and second bus control devices codes control information in the form of write requests and read requests and transmits the coded control information as the control word, and where the other one of the first and second bus control devices receives the control word and decodes the control information therefrom and applies the decoded control information as a control instruction to at least one external device.

5. The bus system of claim 1, where the first and second bus control devices each transcribe received control information after receiving the control word.

6. The bus system of claim 1, where the first and second bus control devices each compare a priority of a request to transmit the data on the at least one data line with a priority of a current transmission of the data on the at least one data line and interrupt the current data transmission on the at least one data line to transmit data of higher priority on the at least one data line.

7. The bus system of claim 1, where the third signaling line signals for bidirectional access by the first and second bus control devices to the interface bus.

8. The bus system of claim 1, where the first and second signaling lines each signal a ready-to-receive state, a non-ready-to-receive state and a just completed transmission operational state of the corresponding allocated first and second bus control device.

9. The bus system of claim 1, where the first and second bus control devices access the third signaling line at a predetermined clock state of the clock.

10. The bus system of claim 1, where the first and second bus control devices each has a comparator that determines and compares the priority of successively received control words, where the comparator allows an interrupt of a current transmission of data on the at least one data line depending on the result of comparing the priority of successively received control words.

11. The bus system of claim 1, further comprising a detector that determines a data congestion condition on a data bus, where the detector interrupts a data transmission on the at least one data line in the event of a determined data congestion.

12. The bus system of claim 1, where the first and second bus control devices are disposed on separate integrated circuits.

13. The bus system of claim 1, where the first bus control device is connected to a processor core through a bus.

14. The bus system of claim 13, where a data transmission rate through the interface bus is lower than a data transmission rate through the bus connecting the first bus control device and the processor core.

15. The bus system of claim 1, where the second bus control device is connected with an at least one external module register that is connected with the at least one additional connected device.

16. A control method for operating a bus system, comprising the steps of:
    exchanging data through an interface bus connected between first and second bus interfaces;
    controlling the exchange of data between a first bus control device allocated to the first bus interface and a second bus control device allocated to the second bus interface;
    signaling a respective state of each of the first and second bus control devices on corresponding first and second signaling lines;
    signaling an exchange of data between the first and second signaling lines on a third signaling line;
    transmitting data over a data line between the first and second bus interfaces, where first and second bus controllers self-arbitrate access of the first and second bus interfaces to the bus;
    synchronizing the bus system using a clock signal through a clock line, where the first and second bus control devices access the bus system at different clock states of the clock;
    generating a control word that relates to the data transmitted on the data line;
    transmitting the control word on the data line;
    receiving the control word on the data line;
    decoding the received control word to extract information relating to the data transmitted on the data line; and relaying subsequently received data based on the control information contained in the control word to at least one connected device, where the first and second signaling lines are unidirectional in opposite directions, and where the first signaling line is allocated to the first bus control device and the second signaling line is allocated to the second bus control device.

17. The method of claim 16, further comprising the step of coding an address into a control word, the address being of an additional device connected to a bus.

18. A bus system, comprising:

an interface bus having a data bus on which data are transmitted; and first and second bus control devices connected together by the interface bus;

where the interface bus further includes first and second signal lines that signal a respective state of each of the first and second bus control devices, a third signal line that signals an exchange of data on the at least one data line;

where the interface bus is configured to communicate a clock signal to the first and the second control devices to synchronize the bus system; and where the first and second bus control devices each generate a control word having control information that relates to the data transmitted on the data bus, and where one of the first and second bus control devices transmits the control word on the data bus and where the other one of the first and second bus control devices receives the transmitted control word on the data bus and provides the received data on the data bus based on the control information contained in the control word to at least one additional connected device, and where the first and second signaling lines are unidirectional in opposite directions, and where the first signaling line is allocated to the first bus control device and the second signaling line is allocated to the second bus control device, where the first and second bus control devices access the bus system at different clock states of the clock and self-arbitrate access of the first and second bus interfaces to the bus.

* * * * *